(12) United States Patent
Rajasekaran

(10) Patent No.: US 11,671,720 B2
(45) Date of Patent: Jun. 6, 2023

(54) HDR VISIBLE LIGHT IMAGING USING TOF PIXEL

(71) Applicant: Microsoft Technology Licensing, LLC, Redmond, WA (US)

(72) Inventor: Vijay Rajasekaran, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 71 days.

(21) Appl. No.: 16/536,000

(22) Filed: Aug. 8, 2019

(65) Prior Publication Data

US 2021/0044767 A1    Feb. 11, 2021

(51) Int. Cl.
| | | |
|---|---|---|
| *G01S 17/89* | (2020.01) | |
| *H04N 25/58* | (2023.01) | |
| *H04N 25/533* | (2023.01) | |
| *H04N 25/621* | (2023.01) | |
| *H04N 25/705* | (2023.01) | |
| *G01S 7/4863* | (2020.01) | |
| *G01S 7/4914* | (2020.01) | |

(52) U.S. Cl.
CPC ............ *H04N 25/58* (2023.01); *G01S 17/89* (2013.01); *H04N 25/533* (2023.01); *H04N 25/621* (2023.01); *H04N 25/705* (2023.01); *G01S 7/4863* (2013.01); *G01S 7/4914* (2013.01)

(58) Field of Classification Search
CPC ............ H04N 5/35536; H04N 5/3535; H04N 5/3591; H04N 5/36965; G01S 17/89; G01S 7/4914; G01S 7/4863
See application file for complete search history.

(56) References Cited

U.S. PATENT DOCUMENTS

| | | | |
|---|---|---|---|
| 8,552,415 B2 * | 10/2013 | Toda ................. | H01L 27/14632 257/13 |
| 8,724,002 B2 | 5/2014 | Rajasekaran | |
| 9,998,692 B1 * | 6/2018 | Griffiths .............. | H04N 17/002 |
| 2006/0131484 A1 * | 6/2006 | Peting ................. | H04N 25/772 250/214 R |

(Continued)

OTHER PUBLICATIONS

"International Search Report and Written Opinion Issued in PCT Application No. PCT/US20/037345", dated Sep. 4, 2020, 13 Pages.

(Continued)

*Primary Examiner* — Shawn S An
(74) *Attorney, Agent, or Firm* — Alleman Hall Creasman & Tuttle LLP

(57) ABSTRACT

One example provides a method of generating a high dynamic range image via a differential TOF pixel comprising an array of pixels each having a first polyfinger and a second polyfinger, the first polyfinger and the second polyfinger being independently controllable to integrate current during an integration period, the method comprising, during the integration period, controlling the first polyfinger for a first exposure time, during the integration period, controlling the second polyfinger for a second exposure time, the second exposure time being shorter than the first exposure time, and for each pixel of the plurality of pixels, comparing a charge collected at the first polyfinger and a charge collected at the second polyfinger to a threshold, and selecting one of the charge collected at the first polyfinger and the charge collected at the second polyfinger for inclusion in the HDR image.

20 Claims, 11 Drawing Sheets

(56) References Cited

U.S. PATENT DOCUMENTS

| | | | |
|---|---|---|---|
| 2009/0073292 A1* | 3/2009 | Castorina | H04N 5/35554 348/294 |
| 2009/0272881 A1 | 11/2009 | Li et al. | |
| 2010/0128159 A1* | 5/2010 | Yamashita | H04N 9/04557 348/311 |
| 2010/0149379 A1* | 6/2010 | Summa | H01L 27/1464 348/311 |
| 2011/0037969 A1* | 2/2011 | Spickermann | G01S 7/4863 356/5.01 |
| 2012/0218426 A1* | 8/2012 | Kaizu | H04N 5/35554 348/208.4 |
| 2016/0142610 A1* | 5/2016 | Rivard | H04N 5/2356 348/239 |
| 2016/0216381 A1* | 7/2016 | Nishihara | G01T 1/1644 |
| 2017/0034464 A1* | 2/2017 | Dielacher | H04N 5/3559 |
| 2017/0214870 A1* | 7/2017 | Miyake | H04N 5/35581 |
| 2017/0214878 A1 | 7/2017 | Van Der Tempel | |
| 2018/0025240 A1* | 1/2018 | Klement | G06F 3/012 348/47 |
| 2018/0176492 A1* | 6/2018 | Bamji | G01S 17/894 |
| 2019/0214428 A1* | 7/2019 | Nagaraja | H01L 31/035272 |

OTHER PUBLICATIONS

Sell, et al., "The Xbox One System on a Chip and Kinect Sensor", In Journal of IEEE Micro, vol. 34, Issue 2, Mar. 2014, pp. 44-53.
Kobayashi, et al., "A 3.4μm Pixel Pitch Global Shutter CMOS Image Sensor With Dual in-pixel Charge Domain Memory", Published in Japanese Journal of Applied Physics vol. 58, Issue SBBL02, Mar. 4, 2019, 10 Pages.

* cited by examiner

HDR VISIBLE LIGHT IMAGING USING TOF PIXEL

BACKGROUND

High-dynamic range (HDR) imaging is the capture of images with a greater dynamic range of luminosity than that captured by standard imaging techniques. One goal of HDR imaging is to achieve a range of luminance on the order of that experienced by the human eye.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to using a time-of-flight (TOF) camera to perform HDR imaging. One example provides a method of generating an HDR image via a differential TOF pixel with two polysilicon gates (polyfingers) controlled by complementary clock signals during an integration period. The method comprises, during the integration period, controlling the first polyfinger for a first exposure time, and during the integration period, controlling the second polyfinger for a second exposure time, the second exposure time being shorter than the first exposure time. The method further comprises, for each pixel of a plurality of pixels, comparing a charge collected at the first polyfinger and a charge collected at the second polyfinger to a threshold, and selecting one of the charge collected at the first polyfinger and the charge collected at the second polyfinger for inclusion in the HDR image based upon the comparing.

DETAILED DESCRIPTION

Figure 1:
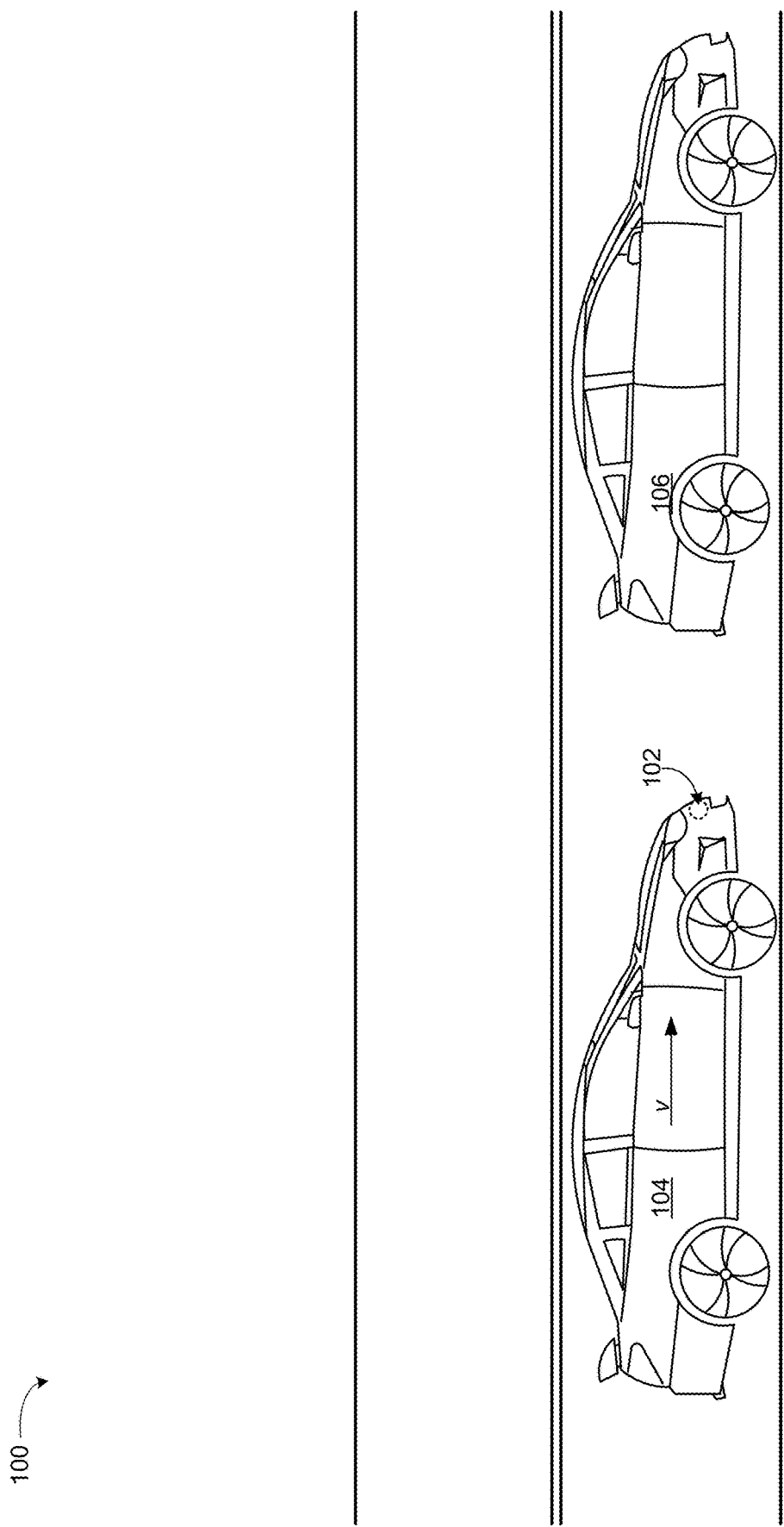
FIGS. 1-4 depict example use scenarios in which a depth image sensor acquires both depth images and two-dimensional monochrome images of a surrounding environment.

HDR imaging techniques may be used to capture HDR images using image sensors that do not have the native capability to adequately capture both low light and high light portions of the scene in a same image. As one example, HDR imaging techniques may be used in an automobile image sensor system to obtain images in conditions having both bright and low-light aspects (e.g. when facing the sun, when encountering headlights at nighttime, etc.).

Various different HDR imaging techniques may be used. For example, HDR images may be produced via a traditional RGB camera by acquiring multiple exposures at different exposure settings in a time-sequential manner, and then merging the sequence of multiple exposures. This may be used to generate an HDR image with a higher luminance range than any individual exposure taken at a single exposure setting. However, as different exposures are taken at different times, any movement within the imaged scene between frames may produce misalignment and motion artifacts (e.g. ghosting) in the resulting HDR image.

To address such problems with motion artifacts, other HDR imaging techniques may utilize spatial multiplexing approaches. As one example, a global shutter multi-photodiode image sensor architecture may help to avoid ghosting associated with time-multiplexed HDR approaches. A global shutter multi-diode image sensor may include two or more photodiodes per pixel to capture different light levels at each photodiode. For example, each pixel may include a relatively larger photodiode to capture lower light scenes and a relatively smaller photodiode to capture brighter scenes. With global shutter, the first photodiode acquires long exposures and the second photodiode acquires short exposures during a same integration period. However, the use of multiple photodiodes per pixel may result in an undesirably large pixel size and complexity, and also may introduce spectral sensitivity mismatch between the differently sized photodiodes.

Another approach to spatial multiplexing is interleaved HDR, in which an image sensor separately acquires long and short exposures at odd and even rows of pixels in a sensor array. However, such techniques reduce image resolution. For example, using only odd rows for long exposures and only even rows for short exposures reduces image resolution by half.

Accordingly, examples are disclosed that relate to using a global shutter TOF pixel configured for depth image sensing (e.g. in a differential TOF camera) to obtain a two-dimensional HDR image of a surrounding environment. As described in more detail below, each pixel of the sensor includes a pair of polysilicon gates (referred to herein as a first polyfinger and a second polyfinger) that are individually controllable to integrate charge from light exposure during an integration period. During the integration period, the first polyfinger integrates light for a first exposure time and the second polyfinger integrates light for a second, shorter exposure time. This allows the sensor array to collect high light and low light data from a scene during a same integration period. At readout, charges collected at each polyfinger are compared to one or more thresholds, such as a pixel saturation value, to determine whether to include the charge collected at the first polyfinger or the charge collected at the second polyfinger in an HDR image. Pixels selected for inclusion in the HDR image are then stitched together to form the HDR image. The dual polyfinger architecture for each pixel of the image sensor array may help to avoid size, complexity, and spectral sensitivity mismatch issues found with multi-photodiode approaches. Further, the same sensor array may also capture a depth image by altering the controlling clock signals duty cycle at which each polyfinger integrates active light for depth images compared to HDR images.

FIG. 1 depicts an example use scenario 100 in which a depth image sensor 102 of a first automobile 104 captures both a depth image and an HDR image of a surrounding real-world environment. As described in more detail below, the depth image sensor 102 comprises an array of pixels each having two independently clocked polyfingers configured for time-of-flight (TOF) depth imaging. The depth image sensor 102 further comprises an electrically controlled optical filter configured to switch between passing visible light or infrared light (IR), which may help to switch between depth imaging and visible light imaging modes. The depth image sensor 102 is operably coupled to a computing system, which may be integrated with or located remotely from the depth image sensor (e.g. elsewhere in automobile 104). Example computing systems are described below with reference to FIG. 12.

In this example, as the first automobile 104 approaches a second automobile 106, depth images acquired via the depth image sensor 102 during a first set of integration periods may help to monitor a proximity of the first automobile 104 to the second automobile 106. During a depth sensing integration period, the first polyfinger is controlled to integrate charge for a first exposure time, and the second polyfinger is controlled to integrate charge for a second exposure time, which may be non-overlapping with the first exposure time. In depth sensing, each polyfinger may integrate charge for approximately 50% of the integration period. Then, for each pixel, the difference between the charge integrated at the first polyfinger and the charge integrated at the second polyfinger may be used to compute a depth value for the pixel.

Figure 2:
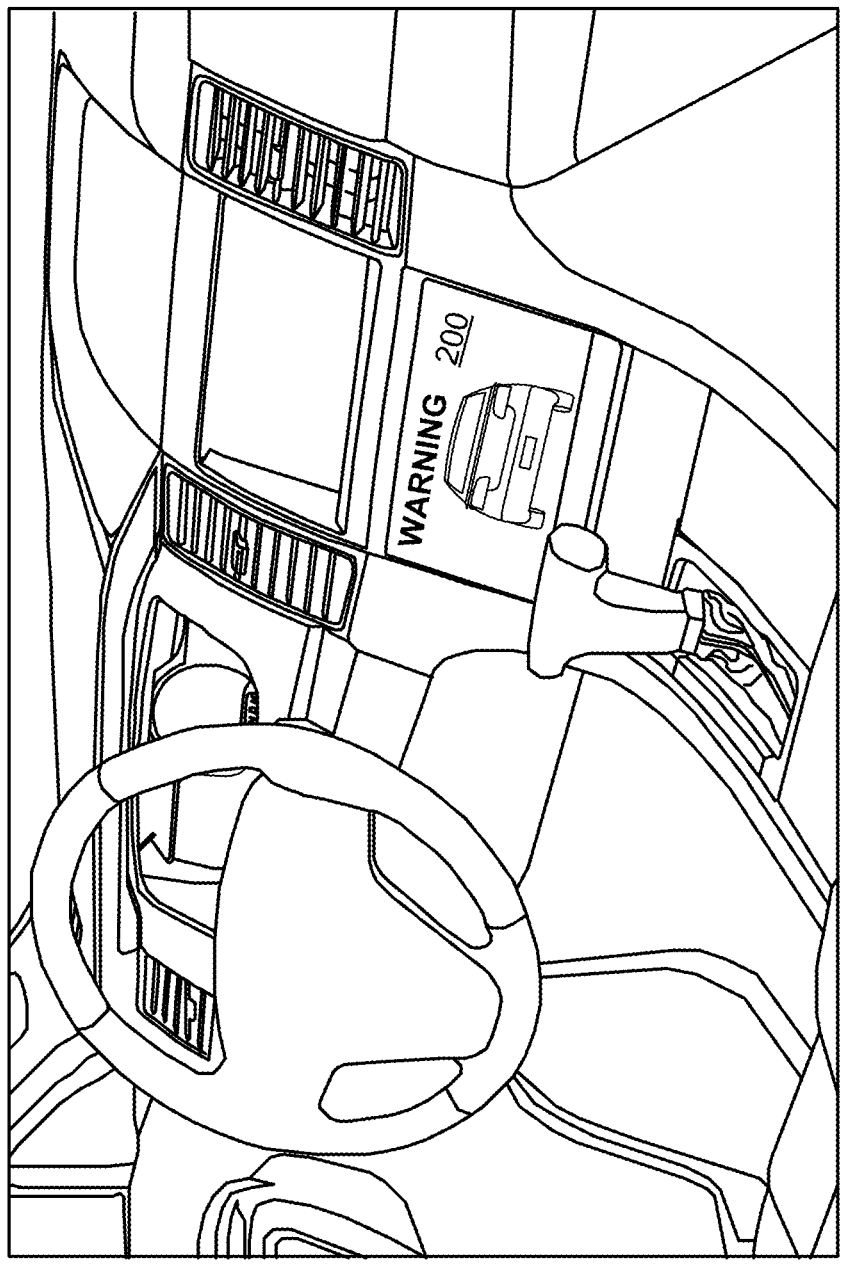

HDR images obtained via the depth sensor 102 may be used for display on an in-vehicle display system. During an HDR integration period, the computing system may control the first polyfinger to integrate charge for a relatively longer exposure time and control the second polyfinger to integrate charge for a relatively shorter exposure time. In some examples, the relatively longer exposure time may comprise 99-99.9% of the integration period, whereas the shorter exposure time may comprise 0.1-1% of the integration period. After integration, for each pixel of the pixel array, the computing system compares the charge collected at the first polyfinger and the charge collected at the second polyfinger to one or more thresholds (e.g. by converting the charges to digital signals via an analog-to-digital converter) to determine which charge to include in the two-dimensional image. The computing system then stitches together selected data for all of the pixels to form an HDR image. As shown in FIG. 2, the HDR image 200 generated in the use scenario 100 of FIG. 1 may be displayed via an interior display of the first automobile 104.

Figure 3:
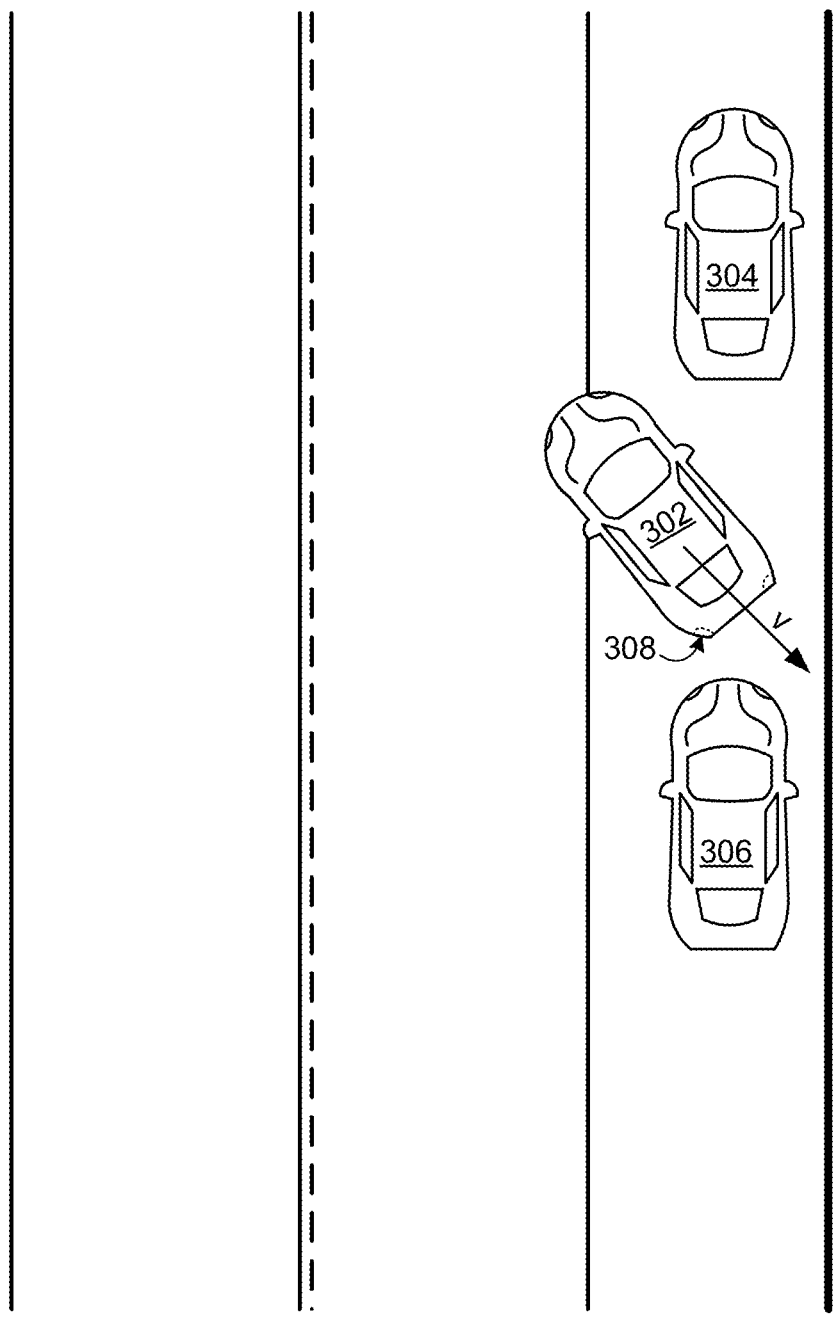
Figure 4:
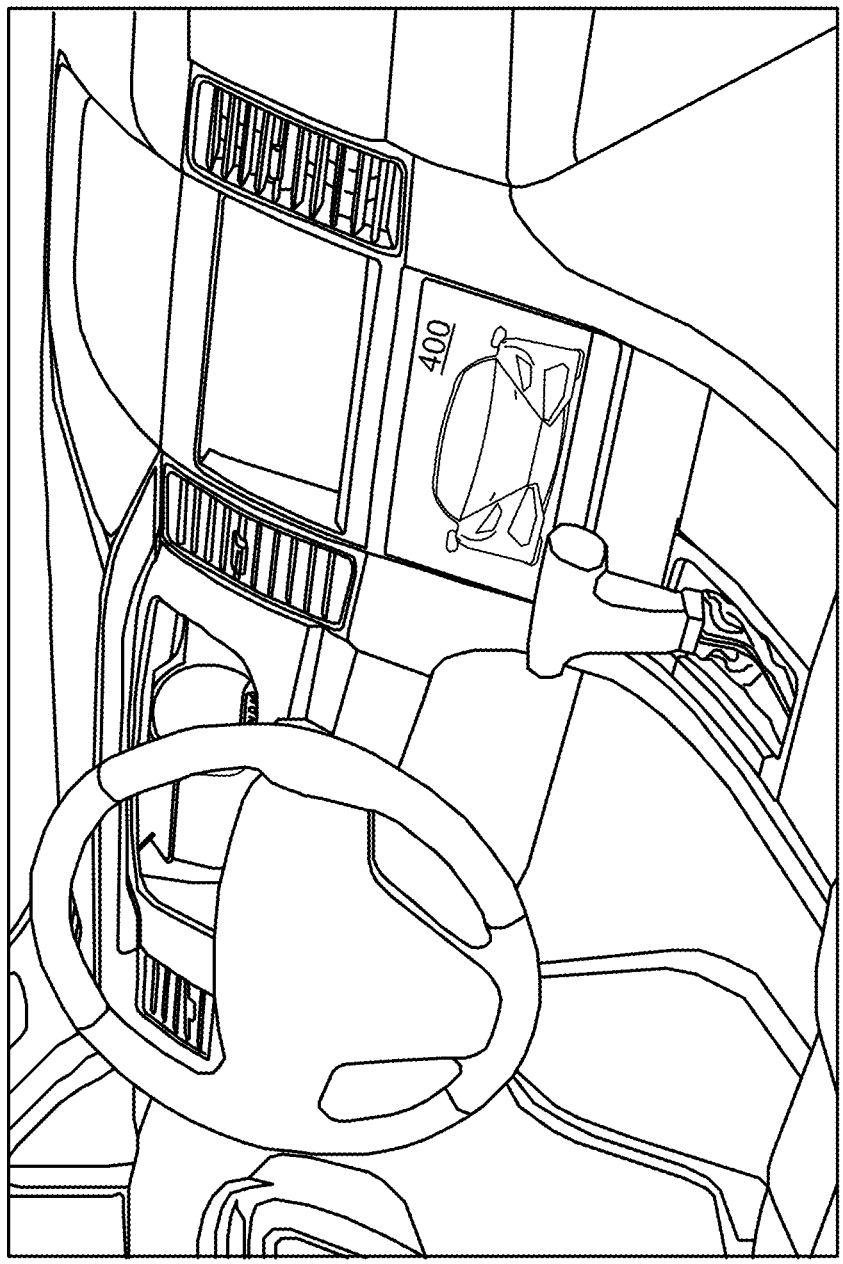

FIG. 3 depicts an example use scenario 300 in which a first automobile 302 is backing into a parallel parking space between two parked automobiles 304 and 306. A depth image sensor 308 located at a rear of the first automobile 302 acquires, during a first set of integration periods, depth images of real-world surroundings, which are used to monitor a distance between the first automobile 302 and other objects (e.g. the parked vehicle 306). During each of a different, second set of integration periods, a first polyfinger and second polyfinger of each pixel of the depth image sensor 308 are controlled to collect long and short exposures, as described above. The depth image sensor 102 may switch an electrically controlled optical filter between passing infrared light for the first set of integration periods and visible light for the second set of integration periods. The two exposures for each pixel are then compared to one or more thresholds to determine which charge for each pixel to include in an HDR image, and the selected exposures for each pixel are stitched to other exposures to form the HDR image. As shown in FIG. 4, the HDR image 400 of the surrounding environment may be output to a display, e.g. to provide visual feedback to a driver of the first automobile 302.

A depth image sensor may generate depth images and HDR images in any suitable sequence and proportion. In some examples, a depth image sensor may be configured to alternately generate HDR images and depth images at a 1:1 ratio. In other examples, a depth image sensor may be configured to generate two or more depth images per each HDR image.

While the examples of FIGS. 1-4 use machine vision in automotive contexts, in other examples a depth image sensor may be used to acquire HDR images in any other suitable context. For example, a depth image sensor may be used as an eye of a robotic system. In one such example, a robotic surgical system may perform depth sensing between a surgical instrument and an anatomical reference point for instrument tracking, and may utilize HDR imaging for displaying visible images to a surgeon. As another example, a depth image sensor may be integrated with a wearable device, such as a head-mounted display device, to perform depth sensing and present video feedthrough augmented reality (AR) imagery, among other possible uses.

Figure 5:
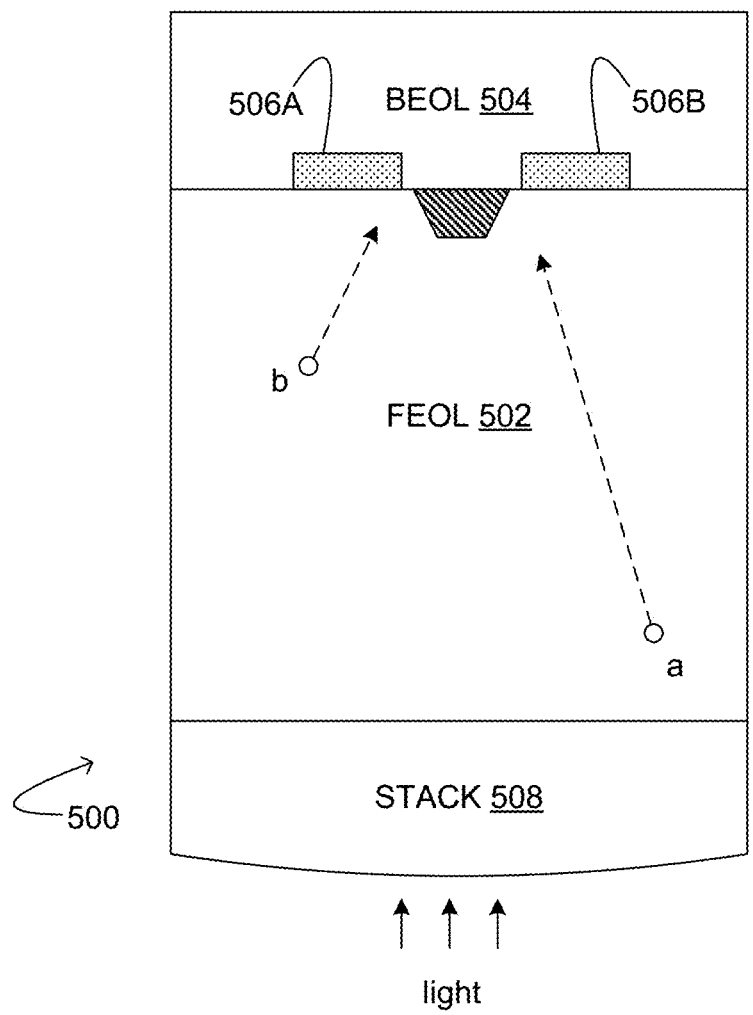
FIG. 5 shows aspects of an example silicon-based, backside illuminated time-of-flight sensor pixel.

FIG. 5 illustrates an example pixel 500 of a time-of-flight (TOF) image sensor that may be used as the depth image sensor 102 and/or 308. An image sensor array comprising pixel 500 may be fabricated on a silicon wafer using a standard complementary metal-oxide-semiconductor (CMOS) process to pattern the wafer. The CMOS process comprises front-end-of-line (FEOL) and back-end-of-line (BEOL) stages, which form a structure having an FEOL (or silicon EPI) layer 502 and a BEOL layer 504. Pixel 500 comprises a first independently controllable polyfinger photoelectron collector 506A and a second independently controllable polyfinger photoelectron collector 506B, which may be formed on the BEOL layer 504 in the BEOL stage. Further, pixel 500 includes an optical stack 508 comprising one or more dielectric anti-reflection layers. The optical stack 508 further may include a micro-lens array.

An electrical bias applied to the first polyfinger 506A is shifted in time with respect to the electrical bias applied to the second polyfinger 506B. For depth imaging, the shift may be performed in a manner to achieve an approximately 50% duty cycle for each polyfinger 506A, 506B. In contrast, for HDR imaging, the shift may be performed in a manner to achieve a longer exposure at one polyfinger and a shorter exposure at the other polyfinger. In either case, photoelectrons a and b generated by absorption of light are injected into the silicon FEOL layer 502 and move toward one or the other of the independently controllable polyfingers 506A, 506B, depending upon the applied bias.

Figure 6:
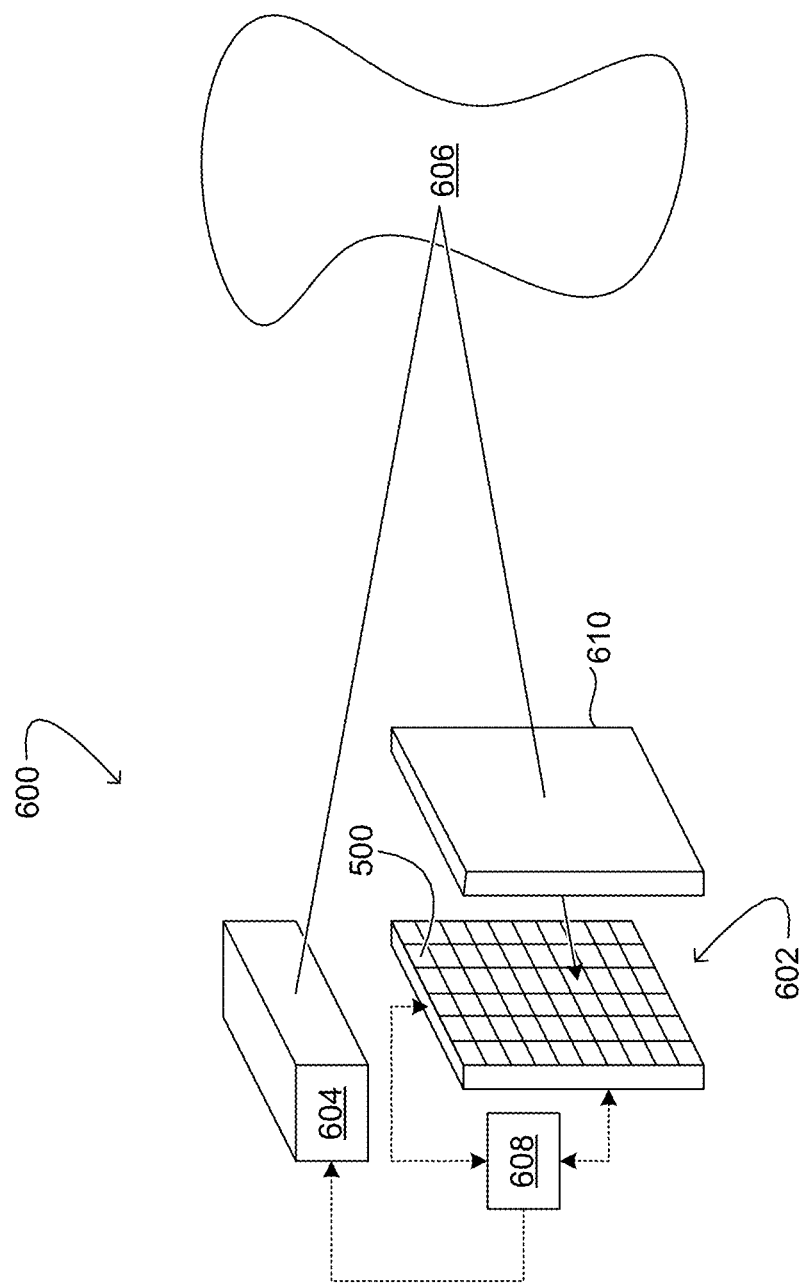
FIG. 6 shows aspects of an example time-of-flight depth image sensor.

FIG. 6 schematically shows aspects of an example TOF depth image sensor 600 comprising an image sensor array 602 having a plurality of pixels 500. The depth image sensor 600 includes an emitter 604 configured to irradiate a subject 606 with modulated light—sinusoidally modulated, pulse modulated, or modulated according to any other periodic waveform. In a more particular embodiment, the emitter 604 may be a programmable near-infrared laser capable of emitting in a continuous-modulation mode or in a repeatingburst mode. In one specific example, the emitter 604 is configured to operate at a modulation frequency of 50-300 megahertz (MHz).

Some modulated light from the emitter 604 reflects back from the subject 606 to the image sensor array 602. Because the light pulses received at the photodetector array 602 have traveled out to the subject 606 and back, they differ in phase from the pulse train released by the emitter 604. The phase difference varies (e.g., increases) in proportion to the distance the subject 606, allowing a distance to be determined at each pixel 500 when depth imaging. Likewise, during HDR imaging, the controller 608 controls the first and second polyfingers of each pixel 500 to respectively collect and read out charge from longer and shorter exposures, and one of the longer or shorter exposure at each pixel is selected to be included in an HDR image, for example, based upon thresholding.

To provide some measure of ambient-light rejection, the image sensor array 602 may be arranged behind an optical filter 610. As mentioned above, the optical filter 610 may be electrically switchable to selectively pass either visible light or IR light at any one time, thereby configuring the image sensor array 602 to switch between visible light imaging and depth imaging contexts. In one embodiment, the emitter 604 may be a narrow-band infrared (IR) emitter such as an IR laser or IR light-emitting diode (LED). Irradiance and photodetection in the IR provides an additional potential advantage in that a human subject will not detect the irradiance from the emitter 604. When controlled to pass IR light, the passband may be chosen to match the emission wavelength band of emitter 604.

Figure 7:
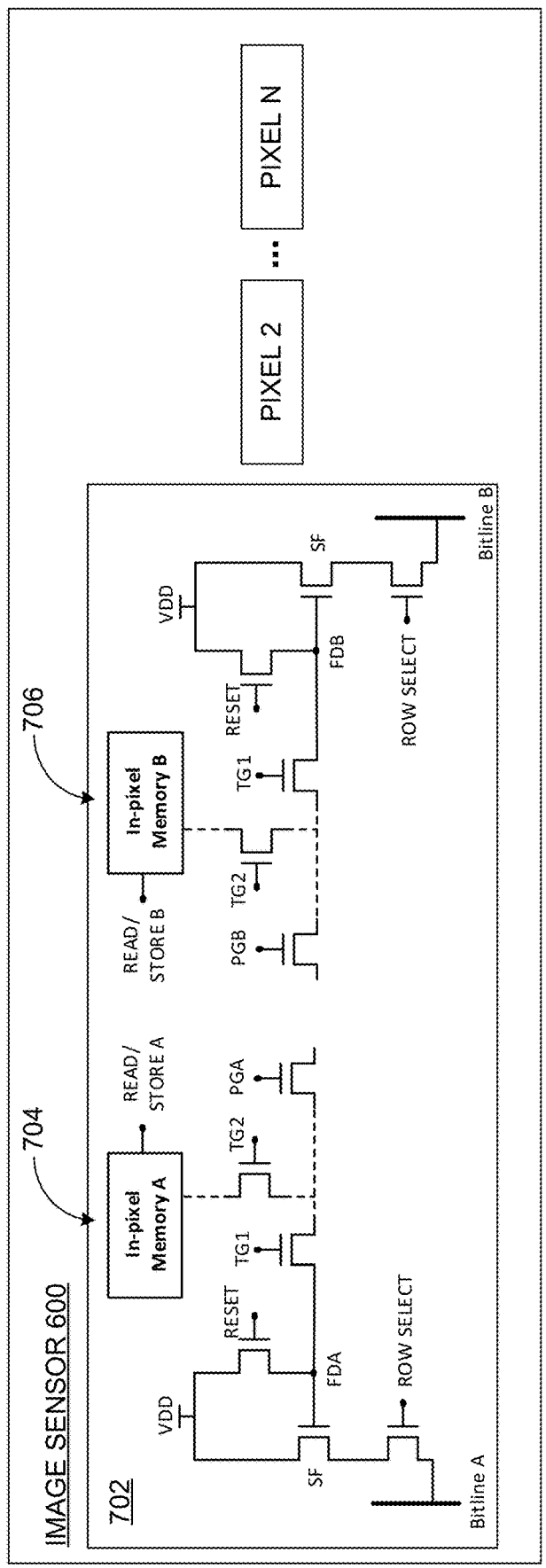
FIG. 7 shows a schematic diagram of an example circuit for the pixel of FIG. 5.
Figure 8:
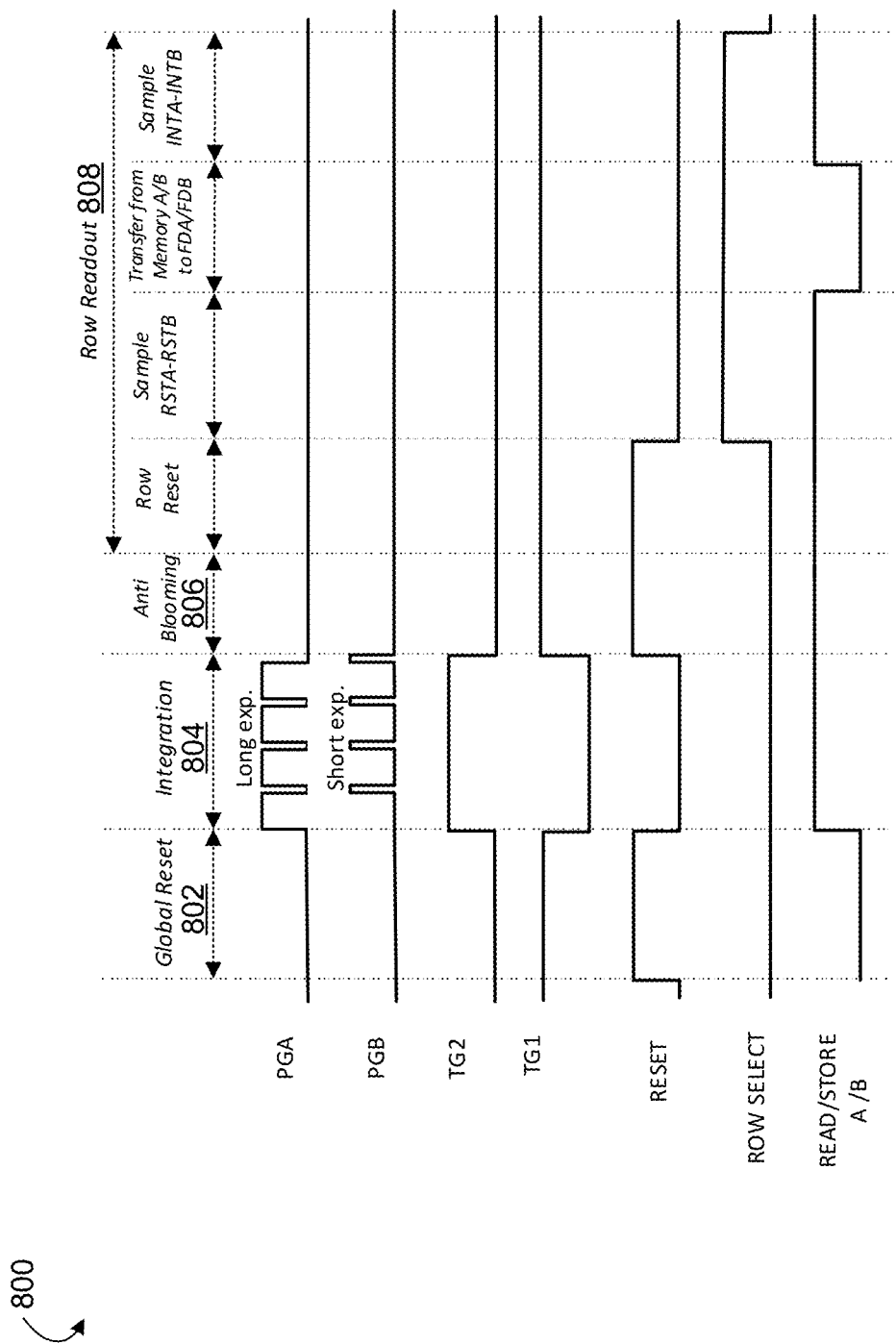
FIG. 8 schematically shows an example timing diagram for generating a monochrome image via the circuit of FIG. 7.

FIG. 7 shows a schematic diagram of an example electrical circuit 702 for driving and reading pixel 500, and FIG. 8 shows a timing diagram illustrating an example method for controlling circuit 702. Circuitry for the first polyfinger (illustrated as photogate A, or PGA) is collectively indicated at 704, and circuitry for the second polyfinger (illustrated as photogate B, or PGB) is collectively indicated at 706. As mentioned above, PGA and PGB are individually controllable, so that a duty cycle for integrating charge at each polyfinger can be adjusted between depth imaging and intensity imaging. In some examples, a size of each pixel 500 is on the order of 3.5 micrometers.

The timing scheme 800 may be implemented as stored instructions executable by the control circuitry of the depth image sensor 600 and/or a host computing system, in various examples. To initiate an integration/readout cycle, a global reset 802 may be used to clear any remaining charge at floating diffusion nodes FDA, FDB and the polyfingers PGA, PGB (FIG. 7). Next, in an integration period 804, for each polyfinger a lower voltage is applied to a first transfer gate TG1, and a higher voltage is applied to a second transfer gate TG2. During the integration period 804, the first polyfinger (PGA) is biased for a first longer exposure time to collect charge for the longer exposure time, and the second polyfinger (PGB) is biased for a second, shorter exposure time to collect charge for the shorter exposure time. In one example where the integration period 804 is 200 microseconds, the first polyfinger may be controlled to achieve a total exposure of 198 to 199.8 microseconds during the integration period 804 for a 99-99.9% duty cycle, and the second polyfinger may be controlled for 0.2 to 2 seconds during the integration period 804 for a 0.1-1% duty cycle. In the depicted example, the exposures of PGA and PGB are interleaved. This helps to avoid motion artifacts when the captured scene includes moving objects.

To help prevent blooming—the bleeding of photo charge from an over-exposed pixel into other nearby pixels—caused by oversaturation, timing scheme 800 comprises an anti-blooming period 806. For example, if the sun is within an imaged scene, without the anti-blooming period 806, an oversaturated pixel(s) may cause may blooming in a resulting image. The depicted anti-blooming period 806 clears the charges collected at the floating diffusion nodes FDA, FDB and polyfingers PGA, PGB, and flushes the charges out through the reset gate, such that any remaining charges do not affect the charge collected in the in-pixel memory that is readout during the readout period 808.

Next, during row readout 808, all rows of pixels are reset and sampled before charge is transferred from in-pixel memory of each polyfinger PGA, PGB to the respective floating diffusion node FDA, FDB and sampled. The charges are amplified and converted to digital signals via an analog-to-digital converter. In some examples, the received light levels are amplified by a multiplier of 1 to 20, which may occur before or after analog-to-digital signal conversion.

Figure 9:
FIG. 9 shows an example image acquired via a long exposure collected at a first polyfinger during an integration period.
Figure 10:
FIG. 10 shows an example image acquired via a short exposure collected at a second polyfinger during the integration period.

FIG. 9 depicts an example of a monochrome image 900 acquired via exposures captured by a first polyfinger (e.g. PGA) of each pixel of a depth image sensor, and FIG. 10 depicts an example of a monochrome image 1000 acquired via exposures captured by a second polyfinger (e.g. PGB) of each of the same pixels. In FIG. 9, the imaged environment outside the window appears saturated while the imaged office interior includes adequate detail. In contrast, more detail of the imaged outdoor environment is visible in the image 1000. Thus, selected pixels of the outdoor environment from FIG. 10 may be combined with selected pixels of the interior from FIG. 9 to form a single HDR image.

To select which data from each pixel to include in an HDR image, the charge collected at each pixel for each of the first image 900 and the second image 1000 may be compared to one or more threshold values (e.g. by converting the charge at each pixel of each image to a digital signal using an analog-to-digital converter). As one example, a threshold near a pixel saturation value may be used. In such an example, the signal from the longer exposure may be selected for a pixel unless the signal exceeds the threshold, indicating that the signal is close to or at saturation, in which case the signal from the shorter exposure may be selected. Based on the comparison, one of the charge collected at PGA and the charge collected at the PGB is selected for inclusion in the HDR image. After performing the pixel-by-pixel threshold comparison, the selected pixels from each image are stitched together to form the HDR image.

Figure 11:
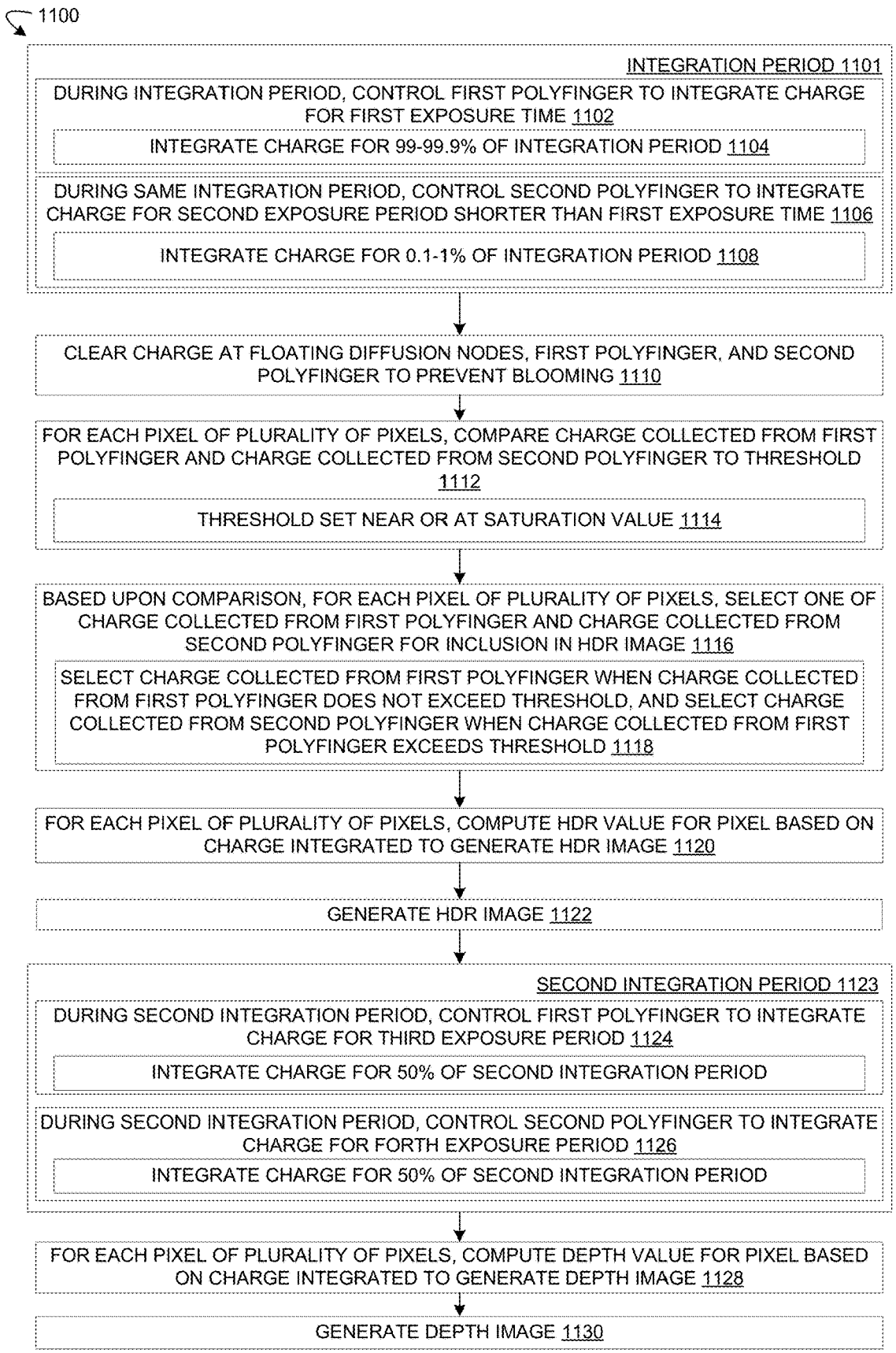
FIG. 11 shows a flowchart illustrating an example method of generating an HDR image via a depth image sensor.

FIG. 11 illustrates an example method 1100 of generating an HDR image via a TOF pixel comprising an array of pixels, each pixel having a first polyfinger and a second polyfinger that are independently controllable to integrate charge during an integration period 1101. During the integration period 1101, method 1100 comprises, at 1102, controlling the first polyfinger for a first exposure time by biasing the first polyfinger to integrate charge during the first exposure time. In some instances, the first exposure time comprises 99-99.9% of the integration period, as indicated at 1104. During the integration period 1101, method 1100 also comprises, at 1106, controlling the second polyfinger for a second exposure time by biasing the second polyfinger to integrate charge for the second exposure time. In some instances, the second exposure time comprises 0.11-1% of the integration period, as indicated at 1108.

After the integration period 1101, in some examples, method 1100 may comprise, at 1110, clearing charge from floating diffusion nodes, the first polyfinger, and the second polyfinger to prevent blooming. Method 1100 further comprises, for each pixel of the plurality of pixels, comparing a charge collected at the first polyfinger and a charge collected at the second polyfinger to a threshold, as indicated at 1112. The threshold may be near or at a pixel saturation value (e.g. within 80-90% of the pixel saturation value), as indicated at 1114, or may be set at any other suitable level. Based on the comparison, at 1116 method 1100 comprises, for each pixel of the plurality of pixels, selecting one of the charge collected at the first polyfinger and the charge collected at the second polyfinger for inclusion in the HDR image. Selecting may comprise selecting the charge collected at the first polyfinger when the charge collected at the first polyfinger does not exceed the threshold, and selecting the charge collected at the second polyfinger when the charge collected at the first polyfinger exceeds the threshold, as indicated at 1118.

At 1120, method 1100 comprises, for each pixel of the plurality of pixels, computing an HDR value for the pixel based on the charges integrated during the integration period. Method 1100 further comprises generating an HDR image, as indicated at 1122.

In some examples, the integration period comprises a first integration and method 1100 comprises, during a second integration period 1123, controlling the first polyfinger to integrate charge for a third exposure time 1124 (e.g. 50% of the second integration period), and controlling the second polyfinger to integrate charge for a fourth exposure time 1126 (e.g. 50% of the second integration period). Further, for each pixel of the plurality of pixels, method 1100 comprises computing a depth value for the pixel based on the charge integrated during the third exposure time and the charge integrated during the fourth exposure time to generate a depth image, as indicated at 1128. Method 1100 further comprises generating the depth image, as indicated at 1130.

HDR and depth images may be generated in any suitable order. In some instances, method 1100 comprises generating depth images and HDR images alternately. In other examples, method 1100 comprises generating two or more depth images per HDR image.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
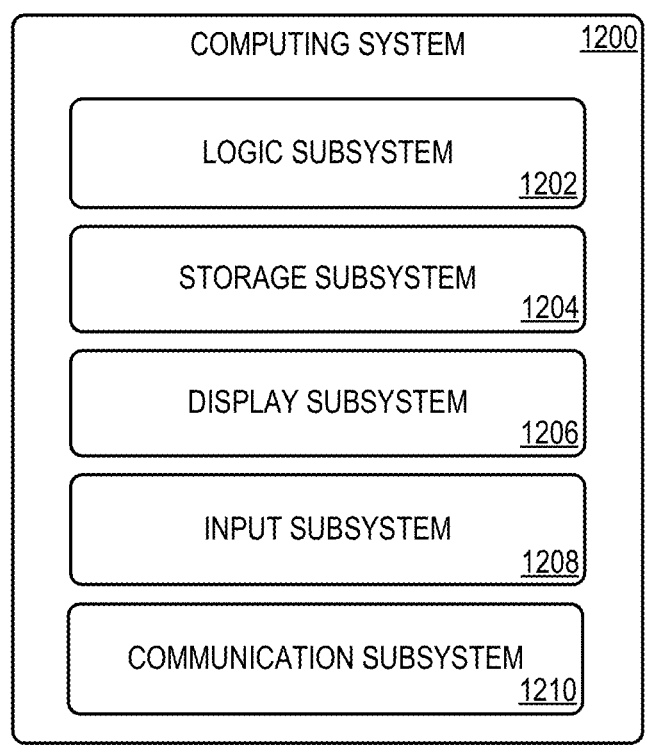
FIG. 12 shows a block diagram illustrating an example computing system.

FIG. 12 schematically shows a non-limiting embodiment of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices.

Computing system 1200 includes a logic machine 1202 and a storage machine 1204. Computing system 1200 may optionally include a display subsystem 1206, input subsystem 1208, communication subsystem 1210, and/or other components not shown in FIG. 12.

Logic machine 1202 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1202 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1204 includes one or more physical devices configured to hold instructions executable by the logic machine to implement the methods and processes described herein. When such methods and processes are implemented, the state of storage machine 1204 may be transformed—e.g., to hold different data.

Storage machine 1204 may include removable and/or built-in devices. Storage machine 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1204 may include volatile, nonvolatile, dynamic, static, read/write, read-only, random-access, sequential-access, location-addressable, file-addressable, and/or content-addressable devices.

It will be appreciated that storage machine 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1202 and storage machine 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 1200 implemented to perform a particular function. In some cases, a program may be instantiated via logic machine 1202 executing instructions held by storage machine 1204. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 1206 may be used to present a visual representation of data held by storage machine 1204. This visual representation may take the form of a graphical user interface (GUI). As the herein described methods and processes change the data held by the storage machine, and thus transform the state of the storage machine, the state of display subsystem 1206 may likewise be transformed to visually represent changes in the underlying data. Display subsystem 1206 may include one or more display devices utilizing virtually any type of technology. Such display devices may be combined with logic machine 1202 and/or storage machine 1204 in a shared enclosure, or such display devices may be peripheral display devices.

When included, input subsystem 1208 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

Another example provides a method of generating a high dynamic resolution (HDR) image via a depth image sensor comprising an array of pixels each having a first polyfinger and a second polyfinger, the first polyfinger and the second polyfinger being independently controllable to integrate current during an integration period, the method comprising, during the integration period, controlling the first polyfinger for a first exposure time, during the integration period, controlling the second polyfinger for a second exposure time, the second exposure time being shorter than the first exposure time, and for each pixel of a plurality of pixels, comparing a charge collected at the first polyfinger and a charge collected at the second polyfinger to a threshold, and selecting one of the charge collected at the first polyfinger and the charge collected at the second polyfinger for inclusion in the HDR image based upon the comparing. In such an example, the first exposure time may additionally or alternatively comprise 99-99.9% of the integration period, and the second exposure time may additionally or alternatively comprise 0.1-1% of the integration period. In such an example, the integration period may additionally or alternatively comprise a first integration period, and the method may additionally or alternatively comprise: during a second integration period, controlling the first polyfinger to integrate charge for a third exposure time, during the second integration period, controlling the second polyfinger to integrate charge for a fourth exposure time, and for each pixel of the plurality of pixels, computing a depth value for the pixel based on the charge integrated during the third exposure time and the charge integrated during the fourth exposure time to generate a depth image. In such an example, depth images and HDR images may additionally or alternatively be generated alternately. In such an example, two or more depth images may additionally or alternatively be generated per HDR image. In such an example, the threshold may additionally or alternatively be within 80-90 of a pixel saturation value. In such an example, selecting the one of the charge collected at the first polyfinger and the charge collected at the second polyfinger for inclusion in the HDR image may additionally or alternatively comprise selecting the charge collected at the first polyfinger when the charge collected at the first polyfinger does not exceed the threshold, and selecting the charge collected at the second polyfinger when the charge collected at the first polyfinger exceeds the threshold. In such an example, the method may additionally or alternatively comprise clearing charge from floating diffusion nodes, the first polyfinger, and the second polyfinger of each pixel at an end of the integration period to prevent blooming.

Another example provides an apparatus comprising a differential TOF pixel comprising an array of pixels each having a first polyfinger and a second polyfinger, the first polyfinger and the second polyfinger being independently controllable to integrate charge during an integration period, a logic subsystem, and a storage subsystem storing instructions executable by the logic subsystem to: during the integration period, control the first polyfinger to integrate charge for a first exposure time, during the integration period, control the second polyfinger to integrate charge for a second exposure time, the second exposure time being shorter than the first exposure time, and for each pixel of the plurality of pixels, compare the charge integrated at the first polyfinger and the charge at the second polyfinger to a threshold, and based on the comparing, select one of the charge integrated at the first polyfinger and the charge integrated at the second polyfinger for inclusion in a high dynamic range (HDR) image. In such an example, the first exposure time may additionally or alternatively comprise 99-99.1% of the integration period and the second exposure time may additionally or alternatively comprise 0.1-1% of the integration period. In such an example, the integration period may additionally or alternatively comprise a first integration period, and the instructions may additionally or alternatively comprise be executable to: during a second integration period, control the first polyfinger to integrate charge for a third exposure time, during the second integration period, control the second polyfinger to integrate charge for a fourth exposure time, and for each pixel of the plurality of pixels, assign a depth value to the pixel based on the charge integrated during the third exposure time and the charge integrated during the fourth exposure time to generate a depth image. In such an example, the instructions may additionally or alternatively be executable to generate depth images and HDR images alternately. In such an example, the instructions may additionally or alternatively be executable to generate two or more depth images per each HDR image. In such an example, the threshold may additionally or alternatively comprise a pixel saturation value. In such an example, the instructions may additionally or alternatively be executable to select the charge collected at the first polyfinger when the charge collected at the first polyfinger does not exceed the threshold, and select the charge collected at the second polyfinger when the charge collected at the first polyfinger exceeds the threshold. In such an example, the instructions may additionally or alternatively be executable to clear charge at floating diffusion nodes, the first polyfinger, and the second polyfinger of each pixel at an end of the integration period to prevent blooming. In such an example, each pixel may additionally or alternatively comprise a size equal to or less than 3.5 micrometers.

Another example provides an apparatus comprising a depth image sensor comprising an array of pixels each having a first polyfinger and a second polyfinger, the first polyfinger and the second polyfinger being independently controllable to integrate charge during an integration period, a logic subsystem, and a storage subsystem storing instructions executable by the logic subsystem to: during a first integration period, control the first polyfinger to integrate charge for a first exposure time, during the first integration period, control the second polyfinger to integrate charge for a second exposure time, the second exposure time being shorter than the first exposure time, for each pixel of the plurality of pixels, compare the charge integrated at the first polyfinger and the charge integrated at the second polyfinger to one or more thresholds, and based on the comparison, select one of the charge integrated at the first polyfinger and the charge integrated at the second polyfinger for inclusion in an HDR image, during a second integration period, control the first polyfinger to integrate charge for a third exposure time, during the second integration period, control the second polyfinger to integrate charge for a fourth exposure time, and for each pixel of the plurality of pixels, assign a depth value to the pixel based on the charge integrated during the third exposure time and the charge integrated during the fourth exposure time to generate a depth image. In such an example, the first exposure time may additionally or alternatively comprise 99-99.9% of the first integration period, and wherein the second exposure time comprises 0.1-1% of the first integration period. In such an example, the apparatus may additionally or alternatively comprise a wearable device or an automobile.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of generating a high dynamic range (HDR) image via a depth image sensor comprising an array of pixels each having a first charge collection point and a second charge collection point, the first charge collection point and the second charge collection point being independently controllable to integrate current during an integration period, the method comprising:
during an HDR integration period, operating the first charge collection point and the second charge collection point according to a first duty cycle, the first duty cycle comprising controlling the first charge collection point for a first exposure time and controlling the second charge collection point for a second exposure time, the second exposure time being shorter than and alternating with the first exposure time such that (i) during the first exposure time, the first charge collection point is active and the second charge collection point is inactive, and (ii) during the second exposure time, the second charge collection point is active and the first charge collection point is inactive;
for each pixel in the array of pixels,
comparing a charge collected at the first charge collection point and a charge collected at the second charge collection point to a threshold, and
selecting one of the charge collected at the first charge collection point and the charge collected at the second charge collection point for inclusion in the HDR image based upon the comparing;
outputting the HDR image;
during a depth image integration period, operating the first charge collection point and the second charge collection point according to a second duty cycle, the second duty cycle comprising controlling the first charge collection point for a third exposure time and controlling the second charge collection point for a fourth exposure time, wherein the second duty cycle is different than the first duty cycle;
for each pixel in the array of pixels, determining a depth value based on a charge collected during the third exposure time and a charge collected during the fourth exposure time; and
outputting a depth image based at least in part on the depth values determined.

2. The method of claim 1, wherein the first exposure time comprises 99-99.9% of the HDR integration period, and wherein the second exposure time comprises 0.1-1% of the HDR integration period.

3. The method of claim 1, wherein the first charge collection point comprises a first polyfinger, and wherein the second charge collection point comprises a second polyfinger.

4. The method of claim 3, wherein depth images and HDR images are generated alternately.

5. The method of claim 3, wherein two or more depth images are generated per HDR image.

6. The method of claim 1, wherein the threshold is within 80-90% of a pixel saturation value.

7. The method of claim 1, wherein selecting the one of the charge collected at the first charge collection point and the charge collected at the second charge collection point for inclusion in the HDR image comprises selecting the charge collected at the first charge collection point when the charge collected at the first charge collection point does not exceed the threshold, and selecting the charge collected at the second charge collection point when the charge collected at the first charge collection point exceeds the threshold.

8. The method of claim 1, further comprising clearing charge from floating diffusion nodes, the first charge collection point, and the second charge collection point of each pixel at an end of the integration period to prevent blooming.

9. The method of claim 1, further comprising:
(i) during the first exposure time, applying a voltage to the first charge collection point and not applying the voltage to the second charge collection point; and
(ii) during the second exposure time, applying the voltage to the second charge collection point and not applying the voltage to the first charge collection point.

10. An apparatus, comprising:
a differential TOF camera comprising an array of differential pixels each having a first polyfinger and a second polyfinger, the first polyfinger and the second polyfinger being independently controllable to integrate charge during an integration period;
a logic subsystem; and
a storage subsystem storing instructions executable by the logic subsystem to:
during a high dynamic range (HDR) integration period, operate the first polyfinger and the second polyfinger according to a first duty cycle, the first duty cycle comprising control the first polyfinger to integrate charge for a first exposure time and control the second polyfinger to integrate charge for a second exposure time, the second exposure time being shorter than and alternating with the first exposure time such that (i) during the first exposure time, the first polyfinger is integrating charge and the second polyfinger is inactive, and (ii) during the second exposure time, the second polyfinger is integrating charge and the first polyfinger is inactive; and for each pixel of a plurality of pixels of the array of differential pixels, compare the charge integrated at the first polyfinger and the charge at the second polyfinger to a threshold, and based on the comparing, select one of the charge integrated at the first polyfinger and the charge integrated at the second polyfinger for inclusion in a high dynamic range (HDR) image;

output the HDR image; and during a depth integration period, operate the first polyfinger and the second polyfinger according to a second duty cycle, the second duty cycle comprising control the first polyfinger for a third exposure time and control the second polyfinger for a fourth exposure time, wherein the second duty cycle is different than the first duty cycle;

for each pixel of a plurality of pixels of the array of differential pixels, determine a depth value based on a charge collected during the third exposure time and a charge collected during the fourth exposure time; and output a depth image based at least in part on the depth values determined.

11. The apparatus of claim 10, wherein the first exposure time comprises 99-99.1% of the HDR integration period and wherein the second exposure time comprises 0.1-1% of the HDR integration period.

12. The apparatus of claim 10, wherein the instructions are executable to generate depth images and HDR images alternately.

13. The apparatus of claim 10, wherein the instructions are executable to generate two or more depth images per each HDR image.

14. The apparatus of claim 10, wherein the threshold comprises a pixel saturation value.

15. The apparatus of claim 10, wherein the instructions are executable to select the charge collected at the first polyfinger when the charge collected at the first polyfinger does not exceed the threshold, and select the charge collected at the second polyfinger when the charge collected at the first polyfinger exceeds the threshold.

16. The apparatus of claim 10, wherein the instructions are further executable to clear charge at floating diffusion nodes, the first polyfinger, and the second polyfinger of each pixel at an end of the integration period to prevent blooming.

17. The apparatus of claim 10, wherein each pixel comprises a size equal to or less than 3.5 micrometers.

18. An apparatus, comprising:

a depth image sensor comprising an array of differential pixels each having a first polyfinger and a second polyfinger, the first polyfinger and the second polyfinger being independently controllable to integrate charge during an integration period;

a logic subsystem; and a storage subsystem storing instructions executable by the logic subsystem to:

during a high dynamic range (HDR) integration period, operate the first polyfinger and the second polyfinger according to a first duty cycle, the first duty cycle comprising control the first polyfinger to integrate charge for a first exposure time and control the second polyfinger to integrate charge for a second exposure time, the second exposure time being shorter than and alternating with the first exposure time such that (i) during the first exposure time, the first polyfinger is integrating charge and the second polyfinger is inactive, and (ii) during the second exposure time, the second polyfinger is integrating charge and the first polyfinger is inactive;

for each pixel of a plurality of pixels of the array of differential pixels, compare the charge integrated at the first polyfinger and the charge integrated at the second polyfinger to one or more thresholds, and based on the comparison, select one of the charge integrated at the first polyfinger and the charge integrated at the second polyfinger for inclusion in an HDR image;

output the HDR image;

during a depth integration period, control the first polyfinger to integrate charge for a third exposure time and control the second polyfinger to integrate charge for a fourth exposure time according to a second duty cycle, wherein the second duty cycle is different than the first duty cycle; and for each pixel of a plurality of pixels of the array of differential pixels, assign a depth value to the pixel based on the charge integrated during the third exposure time and the charge integrated during the fourth exposure time to generate a depth image.

19. The apparatus of claim 18, wherein the first exposure time comprises 99-99.9% of the HDR integration period, and wherein the second exposure time comprises 0.1-1% of the HDR integration period.

20. The apparatus of claim 18, wherein the apparatus comprises a wearable device or an automobile.

* * * * *